United States Patent [19]
Hattori et al.

[11] 4,344,338
[45] Aug. 17, 1982

[54] POWER TRANSMISSION DEVICE

[75] Inventors: Yoshiyuki Hattori, Toyoake; Kazuma Matsui, Toyohashi; Hiroji Kinbara, Aichi, all of Japan

[73] Assignee: Nippon Soken, Inc., Nishio, Japan

[21] Appl. No.: 71,102

[22] Filed: Aug. 30, 1979

[30] Foreign Application Priority Data

Sep. 4, 1978 [JP] Japan .................. 53-108434

[51] Int. Cl.³ .................. F16H 3/74; F16H 3/44; F16D 31/04
[52] U.S. Cl. .................. 74/752 C; 74/774; 192/61
[58] Field of Search .................. 74/751, 752 C, 752 B, 74/774, 794; 192/61

[56]  References Cited
U.S. PATENT DOCUMENTS

| | | | |
|---|---|---|---|
| 881,472 | 3/1908 | Hollister | 74/774 |
| 2,066,450 | 1/1937 | Bascle et al. | 192/61 |
| 2,072,203 | 3/1937 | Fuller | 192/61 |
| 2,195,619 | 4/1940 | Cumbus et al. | 192/61 |
| 2,267,131 | 12/1941 | Paulsen | 74/774 |
| 2,329,594 | 9/1943 | Corrigan | 192/61 |
| 2,552,010 | 5/1951 | Marsell | 192/61 X |
| 2,652,911 | 9/1953 | Somers | 192/61 |
| 2,678,710 | 5/1954 | Sterne | 192/61 |
| 2,830,470 | 4/1958 | Marsell | 74/774 X |
| 2,913,083 | 11/1959 | Bachle et al. | 192/61 |
| 3,258,093 | 6/1966 | Ahlen | 192/61 |
| 4,248,332 | 2/1981 | Noyes | 192/61 |

FOREIGN PATENT DOCUMENTS

| | | | |
|---|---|---|---|
| 124350 | 6/1947 | Australia | 192/61 |
| 270484 | 1/1930 | Italy | 74/774 |
| 289469 | 7/1953 | Switzerland | 192/61 |
| 386870 | 1/1933 | United Kingdom | 192/61 |
| 519039 | 3/1940 | United Kingdom | 192/61 |
| 699354 | 11/1953 | United Kingdom | 192/61 |

Primary Examiner—Leslie Braun
Attorney, Agent, or Firm—Cushman, Darby & Cushman

[57] ABSTRACT

A pressurized fluid-operated power transmission device, is typically shown being shaft driven from an automotive engine as the drive for the compressor of a cooler and a fan is provided with a centrifugal governor and valving for limiting output rotational speed of the power transmission device. In one embodiment a noise-preventing back-flow check valve is provided.

4 Claims, 7 Drawing Figures

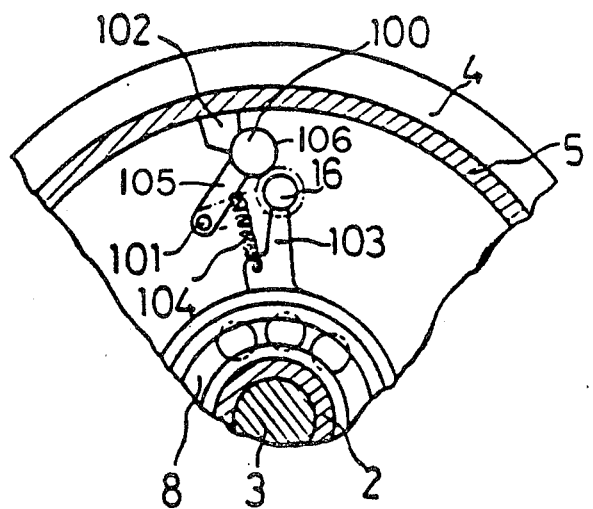
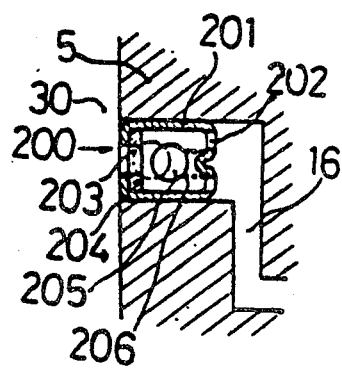 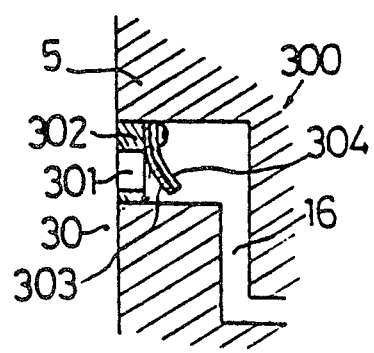

POWER TRANSMISSION DEVICE

FIELD OF THE INVENTION

The present invention relates to a power transmission device applied to a constant speed transmission device which is installed between an input member and an output member so as to be mechanically connected therebetween to operate to adjust the rotative speed of the output member to a predetermined speed, even if the input member is rotated at high speed.

BACKGROUND OF THE INVENTION

In general, when a driven machine which is driven by a driving machine is driven directly or indirectly through a belt means, the rotative speed of the driven machine increases according to the increment of increase in the rotative speed of the driving machine.

However, in many cases, a constant rotative speed is required, e.g. where the driven machine is a power steering pump or a compressor for use in a cooler which is driven by an internal combustion engine acting as a driving machine regardless of the rotational speed and the variance of the load of the internal combustion engine.

In order to satisfy the above described requirement, a fluid power transmission coupling has been used.

The usual fluid coupling device is provided with a rotor fixed to a driving shaft, and a casing spaced from the rotor at a short distance, which acts as a driven shaft. A fluid having high viscosity such as silicon oil is provided as a working fluid sealed in a chamber defined between the rotor and the casing.

Conventional fluid coupling devices having the above described structure are defective as follows. Firstly, a large amount of torque cannot be transmitted thereby since the shaft torque is transmitted by using the viscosity resistance of the sealed fluid, and a larger outer diameter is required in such a power transmission device for transmitting a large torque thereby.

Second, since the rotative speed of the driven shaft is determined due to the load of the driven side, this device cannot be easily designed. Namely, a large load variation is not desirable on the driven side thereof.

Thirdly, since slippage occurs between the rotor and the casing even at a low rotative speed, transmission efficiency is not good.

Fourthly, since the viscosity of the viscous fluid is varied according to ambient temperature, the operation characteristics are non-uniform for that additional reason.

REFERENCE TO PRIORITY APPLICATION

This is based on a prior Japanese patent application No. 108434/1978 which we filed in Japan on Sept. 4, 1978, in respect of which a priority claim is made. Resort may be had to the contents of that priority application, all of which are hereby incorporated herein by reference.

SUMMARY OF THE INVENTION

Accordingly, an object of the present invention is to provide a small sized power transmission device which transmits a large amount of torque with uniform operation.

Another object of the present invention is to provide a power transmission device having a high transmission efficiency.

Still another object of the present invention is to provide a power transmission device which adjusts the rotative speed of the output side thereof to a desired speed, regardless of the variance in the rotative speed on the input side thereof.

A further object of the present invention is to provide a power transmission device which prevents the occurrence of noise when the operation of the input side thereof is stopped.

In this instance, a pressurized fluid-operated power transmission device is typically shown being shaft driven from an automotive engine as the drive for the compressor of a cooler and a fan is provided with a centrifugal governor and valving for limiting output rotational speed of the power transmission device. In one embodiment a noise-preventing back-flow check valve is provided.

The present invention provides a small sized power transmission device which transmits a large torque with a uniform operation property, adjusts the rotative speed of the output side to a desired speed, regardless of the load variance in the output side and prevents the occurrence of noise when the operation thereof is stopped.

Namely, the power transmission device of the present invention uses a gear pump composed of a casing, a driving gear rotatably disposed within the casing and at least two driven gears which are axially supported by the casing and rotated by the driving gear.

An input member is connected to the driving gear and an output member is connected to the casing.

A fluid inlet opening and a fluid outlet opening are provided in the casing. Within the casing, there is formed a fluid passage for the fluid which is supplied through the driving gear and the driven gears. A control device for controlling the amount of the flowing fluid in response to the rotative speed of the input member is provided in the outlet side of the fluid passage.

According to the power transmission device of the present invention, the positive displacement pump is operated or not operated accordingly as the amount of the flowing fluid to control the rotative speed of the output member to a predetermined speed, regardless of the variation of the rotative speed of the input member, when the input member rotates at a rotative speed above a predetermined speed.

Furthermore, when a non-return device for checking the return of the fluid is provided in the inlet side of the fluid passage of the above described power transmission device, noise which otherwise would be generated by the returning fluid when operation of the input member is stopped, is prevented.

Other objects and advantages of the invention will become apparent from the following description of the embodiments with reference to the accompanying drawings.

The principles of the invention will be further discussed with reference to the drawings wherein preferred embodiments are shown. The specifics illustrated in the drawings are intended to exemplify, rather than limit, aspects of the invention as defined in the claims.

BRIEF DESCRIPTION OF THE DRAWINGS

In the Drawings

FIG. 5 is a fragmentary cross-sectional view taken along the line V—V of FIG. 4; and FIG. 6 and FIG. 7 are fragmentary sectional views of the fluid non-return valve devices to be installed in the power transmission device of the present invention as respective alternatives to the fluid non-return device shown in FIG. 4.

DETAILED DESCRIPTION

Hereinafter, a first embodiment of the present invention will be explained with reference to FIG. 1 to FIG. 3, wherein an internal combustion engine of an automobile and a compressor for use in a cooler are shown connected by the power transmission device.

Figure 1:
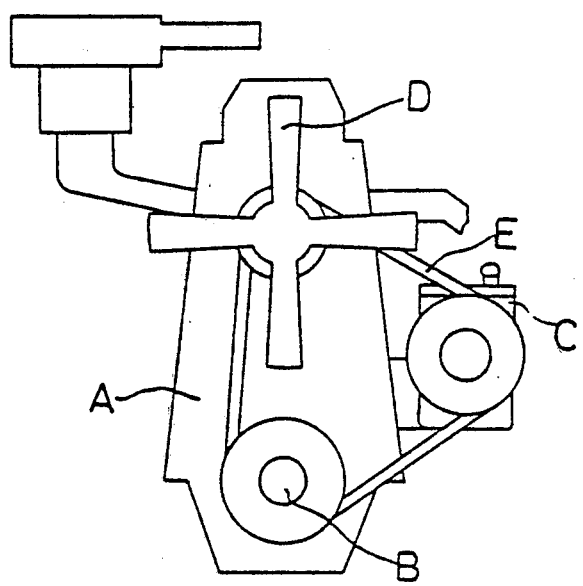
FIG. 1 is an outline front elevation view of a constant speed power transmission device which is applied to operate a compressor of a cooler of an automobile.

In FIG. 1, reference character A designates an internal combustion engine and reference character B designates a power transmission device connected to a crank shaft (not shown). A compressor for use in a cooler C and a cooling fan D are connected to the power transmission device B through a belt means E. The rotation of the crank shaft is transmitted through the power transmission device B to the compressor C and the cooling fan D.

Figure 2:
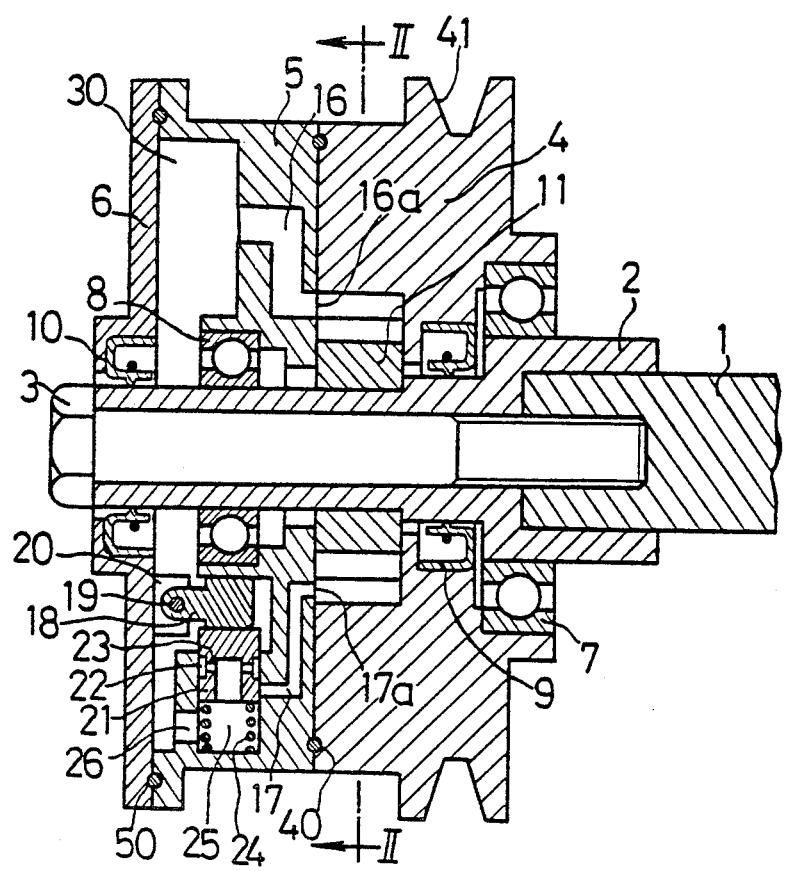
FIG. 2 is a longitudinal sectional view of a first embodiment of a power transmission device of the present invention taken along the line II—II of FIG. 3.
Figure 3:
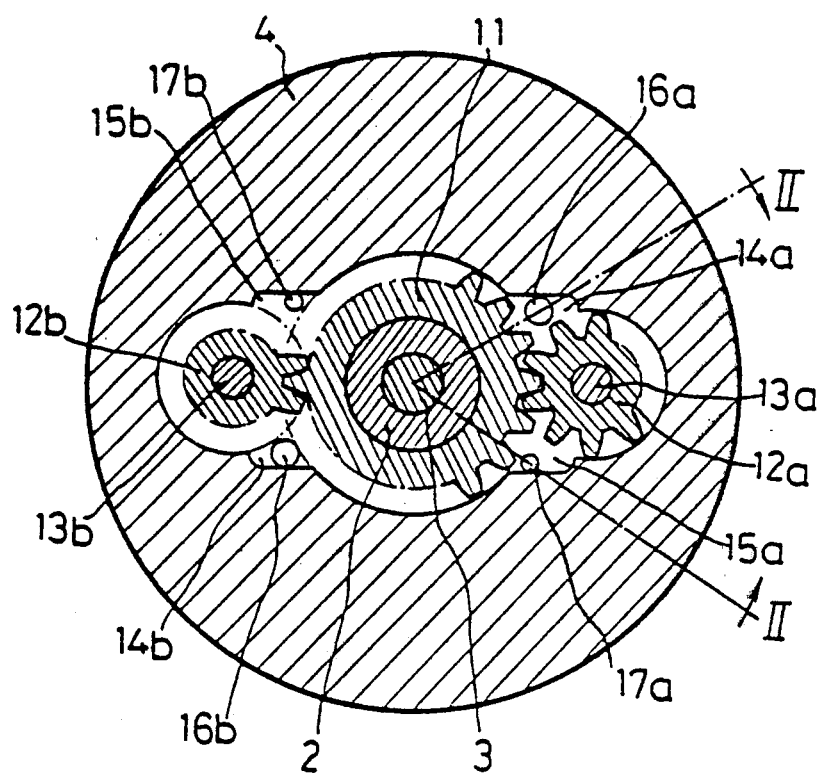
FIG. 3 is a cross-sectional view taken along the line III—III of FIG. 2.

In FIG. 2 and FIG. 3, a crank shaft 1 of the internal combustion engine acting as an input member is shown integrally fixed to a driving shaft 2 by a key (not shown) and a bolt 3. A driving gear 11 is shown fixed to the driving shaft 2.

Driven gears 12a and 12b are rotatably supported by shafts 13a and 13b, respectively, which are fixed in both sides of the driving gear 11 within a casing 4. Driven gears 12a and 12b are engaged with the driving gear 11, respectively so as to be relatively rotated with each other.

A pulley 41 is shown integrally formed in an outer periphery of the casing 4. And an end cover 5 is fixed to the end surface of the casing 4 by a bolt or the like.

An O-ring 40 is provided in a contact surface between the casing 4 and the end cover 5 to prevent the fluid from leaking out through the contact surface.

A bearing device 7 is provided between the casing 4 and the shaft 2 and a bearing device 8 is provided between the end cover 5 and the shaft 2 so that the casing 4, the side cover 5 and the shaft 2 are relatively rotated.

The driving gear 11, the driven gears 12a and 12b, the casing 4 and the end cover 5 constitute an oil pump portion and in the oil pump portion, fluid outlet chambers 15a and 15b and fluid inlet chambers 14a and 14b are provided. The casing 4 and the pulley 41 act as an output member.

An end plate 6 is fixed to the end surface of the end cover 5 by a bolt or the like. O-ring 50 is provided in the contact surface of the end plate 6 and the end cover 5 to prevent the fluid from leaking out through the contact surface thereof. A fluid storage chamber 30 is formed by the end cover 5 and the end plate 6.

Oil seal members 9 and 10 prevent the oil from leaking out from the fluid storage chamber 30. The oil seal member 9 is provided in the casing 4 and the oil seal member 10 is provided in the end plate 6 so as to be slid with the shaft 2, respectively.

A fluid inlet passage 16 is provided through the end cover 5. One end of the fluid inlet passage 16 is communicated with the inlet chambers 14a and 14b through fluid inlet ports 16a and 16b. The other end thereof is communicated with the fluid storage chamber 30. A fluid outlet passage 17 which is provided through the end cover 5 is communicated with the outlet chambers 15a and 15b through outlet ports 17a and 17b in one end thereof and also communicated with the fluid storage chamber 30 through a spool 21 (as further described later) in the other end thereof.

A fluid passage is formed by the fluid outlet passage 17, the fluid storage chamber 30 and the fluid inlet passage 16.

The spool 21 is slidably inserted in an opening provided through the end cover 5 which is communicated with the fluid outlet passage 17 and is pushed in the direction of the axis of the driving shaft 2 by means of a spring 24. The spool 21 is provided with a groove 22 in the outer periphery thereof, which is communicated with a spring chamber 25 through a control port 23.

The spring chamber 25 is communicated with the fluid storage chamber 30 through a passage 26 which is provided in the side cover 5.

A governor weight 18 is attached to a foot portion 20 which is provided in the end plate 6 by a pin 19 so as to be turned thereabout. The governor weight 18 is contacted with an end portion of the spool 21 and the governor weight 18 constitutes a discharged fluid control device which operates due to a centrifugal force generated by the rotation of the casing 4.

Hereinafter, operation of the power transmission device of the first embodiment of the present invention having the above described structure will be explained.

When the internal combustion engine A is operated, the power transmission device is operated due to the rotation of the crank shaft 1. Then, a compressor C for use in a cooler and a fan D, which are connected with the power transmission device through a belt means E, are rotated. At this time, even if the crank shaft 1 of the internal combustion engine A is rotated at a rotative speed above a predetermined speed, the compressor C and the fan D do not rotate at a rotative speed above the predetermined speed since the rotative speed of the power transmission device B is maintained constant.

Namely, in the power transmission device of the present invention, when the crank shaft 1 is rotated, the shaft 2 is rotated together therewith. Then, the driving gear 11 which is fixed to the driving shaft 2 is integrally rotated and driven gears 12a and 12b which are engaged with the driving gear 11 are relatively rotated with the casing 4.

As the pressure of the oil supplied into the outlet chambers 15a and 15b is increased, the driven gears 12a and 12b are revolved around the driving gear 11 by a counter force proportional to the increased oil pressure, to rotate the casing 4 which is fixed to the shafts 13a and 13b of the driven gears 12a and 12b into the same direction as that of the driving gear 11.

And the rotation is transmitted to the compressor C, and to the fan D through the pulley 41 of the casing 4 and the belt means E which connects the compressor C and the fan D. When the oil pressure within the outlet chambers 15a and 15b is increased, the driven gears 12a and 12b are prevented from being rotated and are locked in the driving gear 11 to be turned together therewith. Thus, the casing 4 is integrally rotated with the driving gear 11 together with the driven gears 12a and 12b.

Explaining in more detail, the spool 21 which is provided in the end cover 5 integrally connected to the casing 4 is not operated at a predetermined rotative speed of the casing 4 to close the fluid outlet passage 17. When the rotative speed of the casing 4 exceeds the predetermined speed, the governor weight 18 is operated due to centrifugal force to push the spool 21. Then, the spool 21 is moved overcoming the pushing force of the spring 24 to open the fluid outlet passage 17.

Thus, when the casing 4 is rotated under a predetermined rotative speed, the oil within the outlet chambers 15a and 15b is sealed. According to the increment in the oil pressure within the outlet chambers 15a and 15b, the rotative speed of the casing 4 is increased and approaches to that of the driving gear 11, namely that of the crank shaft 1.

Then, when the rotative speed of the casing 4 exceeds the predetermined speed, the spool 21 is moved due to the operation of the governor weight 18 to open the fluid outlet passage 17. As a result, the oil flows into the fluid storage chamber 30 therethrough. Therefore, even if the rotative speed of the crank shaft 1 of the input side exceeds the predetermined speed, that of the casing 4 of the output side is maintained constant, since the oil pressure within the outlet chambers 15a and 15b is adjusted.

The control device of the first embodiment can be composed of such an electromagnetic valve as to operate the spool thereof and to open the fluid outlet passage when the rotative speed of the casing reaches a predetermined rotative speed.

A second embodiment of the present invention will now be explained with reference to FIG. 4 and FIG. 5 wherein the same reference numerals as in the first embodiment are used for the same parts.

The power transmission device of the second embodiment is further provided with a non-return device for preventing the oil from flowing backwards when the operation of the device is stopped.

The other elements of the second embodiment than the non-return device are identical to those of the first embodiment so explanation thereof will be omitted.

Figure 4:
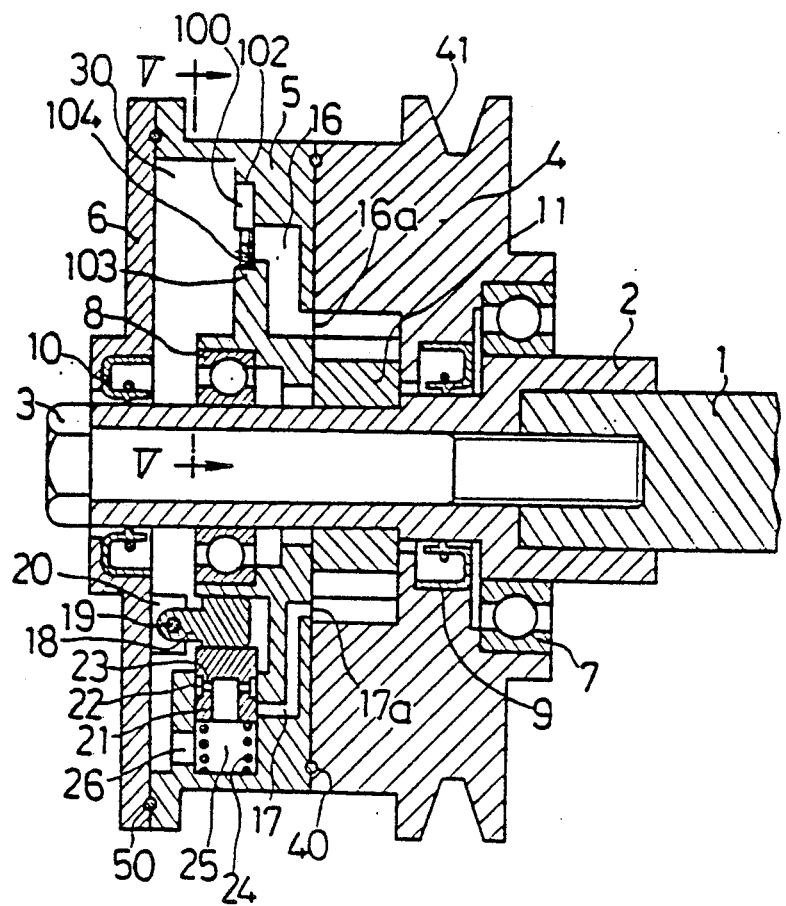
FIG. 4 is a longitudinal sectional view of a second embodiment of a power transmission device of the present invention.

As shown in FIG. 4 and FIG. 5, a centrifugal governor 100 composed of an arm portion 105 and a weight portion 106 is pivotally supported by a shaft 101 which is fixed to the side cover 5 in the base end portion thereof. And also the side cover 5 is provided with seats 102 and 103 with which a free end of the centrifugal governor 100 is contacted when it is turned.

A spring 104 is stretched between the arm portion 105 of the centrifugal governor 100 and the seat 103 to push the centrifugal governor 100 clockwise until it is contacted with the seat 103. Thus, the opening of the fluid inlet passage 16 is closed by the weight portion 106 of the centrifugal governor 100. And when the side cover 5 is rotated together with the crank shaft 1 through the driving gear 11 and the casing 4, the centrifugal governor 100 is turned counterclockwise due to the centrifugal force overcoming the pushing force of the spring 104 to open the fluid inlet passage 16. And as the rotative speed of the crank shaft 1 is decreased, the centrifugal governor 100 is turned clockwise by means of the spring to close the fluid inlet passage 16.

Hereinafter, the operation of the second embodiment which is provided with a non-return device in the inlet passage 16 will be explained.

The centrifugal governor 100 is pushed to the seat 103 by means of the spring 104 to close the inlet passage 16 when the internal combustion engine is stopped. As the rotative speed of the crank shaft is increased when the internal combustion engine is operated, the centrifugal governor 100 is turned about the shaft 101 due to centrifugal force to open the inlet passage 16. And the centrifugal governor is stopped by the seat 102. In this case, by operating the non-return device so as to open the fluid inlet passage at a low rotative speed of the crank shaft 1, for example, at a rotative speed of the idling operation thereof, the centrifugal governor 100 is turned to open the inlet passage 16 at the moment when the internal combustion engine is started.

When the operation of the internal combustion engine is stopped, the driven portion of the device still continues rotating due to the inertia. Therefore, the casing 4 and the side cover 5 also continue rotating through the belt means E.

However, since the driving gear 11 is stopped almost instantaneously, the gear pump is operated reversely to suck in the oil from the fluid outlet passage 17 and discharge the oil from the fluid inlet passage 16.

In the present invention, since the centrifugal governor 100 is operated at a predetermined low rotative speed to close the fluid inlet passage 16, the oil is prevented from being discharged into the fluid storage chamber 30 from the inlet passage 16 completely or almost completely. As a result, the noise which otherwise would be generated in the transmission device when the internal combustion engine is stopped, is prevented.

Namely, when the device is about to be operated so as to discharge the oil from the fluid inlet passage 16 due to the stop of the internal combustion engine, the fluid outlet passage 17 is closed by the spool 21. Therefore, the pressure of the outlet passage side becomes negative to generate a large noise when air or oil is sucked therein. However, by providing the non-return device in the inlet passage side as described above, such a large noise as described above can be prevented.

Instead of such a non-return device as described above, other means, for example, a one way valve, can be employed.

A one way valve 200 useful for that purpose is shown in FIG. 6, in which a valve casing 201 is provided in an opening of the inlet passage 16. Openings 202 and 203 are provided through the walls of the casing 201 in the side of the fluid inlet chambers and that of the fluid storage chamber 30, respectively.

A seat 204 is fixed to an inner wall of the casing 201 in the side of the fluid storage chamber 30. The opening provided through the seat 204 and the opening 203 form an inlet hole. And a check ball 205 which is provided within a casing is supported and pushed to the direction of the inlet opening by a spring 206 to allow the oil to flow from the fluid storage chamber 30 but to prevent the oil to flow reversely.

In another useable one way valve as shown in FIG. 7, a valve seat 302 is provided for forming an inlet hole 301 in an opening of the fluid inlet passage 16. One end of each of a reed valve 303 and a stopper 304 is screwed to the valve seat 302 to allow the oil to flow only from the fluid storage chamber 30 to the direction of the fluid inlet chambers 14a and 14b.

As described above, the power transmission device of the present invention is provided with a gear pump and a control device of controlling the amount of the fluid therein according to the rotative speed of an internal combustion engine.

According to the power transmission device of the present invention, the rotative speed of the driven portion of the device can be maintained constant in spite of the increment in the rotative speed of the driving portion thereof.

Furthermore, the noise which would otherwise be generated when the driving portion of the device is stopped is prevented by providing a non-return device in a fluid inlet passage. In addition, according to the small-sized power transmission device of the present invention, a large torque can be transmitted easily. Therefore, the power transmission device of the present invention is quite efficient in applying it to a power transmission device which connects a compressor for use in a cooler, a power steering pump and the like with an internal combustion engine.

Having now fully described the invention, it will be apparent to one of ordinary skill in the art that many changes and modifications can be made thereto without departing from the spirit and scope of the invention as set forth herein.

What is claimed is:

1. A power transmission device comprising:
    a casing with means for connection to an output member;
    a driving shaft with means for connection to an input member and coaxially disposed within said casing so as to be relatively rotated with said casing;
    a driving gear disposed within said casing and coaxially fixed to said driving shaft;
    at least two driven gears rotatably supported by said casing and engaged with said driving gear within said casing;
    at least two fluid inlet chambers and at least two fluid outlet chambers formed within said casing with said driving gear and with said at least two driven gears within said casing;
    a fluid storage chamber formed within said casing;
    a fluid inlet passage and a fluid outlet passage of which one ends are communicated with said at least two fluid inlet chambers and said at least two fluid outlet chambers, respectively and the other ends thereof being communicated with said fluid storage chamber; and
    a discharged fluid control device disposed in said fluid outlet passage, said discharged fluid control device being provided with a valve means which closes said fluid outlet passage at a rotative speed of said casing under a predetermined speed and opens said fluid outlet passage at a rotative speed of said casing above the predetermined speed;
    a non-return device disposed in an opening portion of said fluid inlet passage into said fluid storage chamber for preventing the fluid from flowing out of said fluid inlet passage reversely, said non-return device including centrifugal force-activated means for substantially instantaneously opening and closing said fluid inlet passage in dependence upon whether said casing is rotating faster or slower than a predetermined speed.

2. A power transmission device according to claim 1, wherein:
    said discharged fluid control device comprises
    (a) a spool for opening and closing said fluid outlet passage, a spring supporting one end of said spool on the side of the outer periphery of said casing; and
    (b) a centrifugal governor comprising:
        (i) an arm portion formed in one end thereof and rotatably supported by said casing therewithin, and
        (ii) a weight portion formed in the other end thereof and contacted with the other end of said spool, which turns due to the centrifugal force generated by the rotation of said casing to push said spool, thus overcoming said spring so as to communicate said fluid outlet passage with said fluid storage chamber.

3. A power transmission device according to claim 1, wherein:
    said non-return device comprises
    (a) a centrifugal governor comprising
        (i) an arm portion formed in one end thereof and rotatably supported by said casing therewithin, and
        (ii) a weight portion formed in the other end thereof, and
    (b) a stopper means provided near said opening portion of said fluid inlet passage,
    said weight portion being contacted with said stopper means by a spring stretched therebetween at a rotative speed of said casing under a predetermined speed to close said opening and being turned to the direction of the outer periphery of said casing overcoming said spring due to the centrifugal force generated by the rotation of said casing at a rotative speed of said casing above the predetermined speed to open said opening.

4. A power transmission device comprising:
    a casing with means for connection to an output member;
    a driving shaft with means for connection to an input member and coaxially disposed within said casing so as to be relatively rotated with said casing;
    a driving gear disposed within said casing and coaxially fixed to said driving shaft;
    a driven gear rotatably supported by said casing and engaged with said driving gear within said casing;
    a fluid inlet chamber and a fluid outlet chamber formed within said casing with said driving gear and with said driven gear within said casing;
    a fluid storage chamber formed within said casing;
    a fluid inlet passage and a fluid outlet passage of which one ends are communicated with said fluid inlet chamber and said fluid outlet chamber, respectively, and the other ends thereof being communicated with said fluid storage chamber; and
    a discharged fluid control device disposed in said fluid outlet passage, said discharged fluid control device being provided with a valve means which closes said fluid outlet passage at a rotative speed of said casing under a predetermined speed and opens said fluid outlet passage at a rotative speed of said casing above the predetermined speed.

* * * * *